United States Patent
Haverberg

(10) Patent No.: US 9,945,715 B2
(45) Date of Patent: Apr. 17, 2018

(54) WEIGHT LOADER FOR MOVING AT LEAST TWO LOADS

(71) Applicant: THE BOEING COMPANY, Chicago, IL (US)

(72) Inventor: David Arne Haverberg, Renton, WA (US)

(73) Assignee: THE BOEING COMPANY, Chicago, IL (US)

(*) Notice: Subject to any disclaimer, the term of this patent is extended or adjusted under 35 U.S.C. 154(b) by 263 days.

(21) Appl. No.: 14/871,559

(22) Filed: Sep. 30, 2015

(65) Prior Publication Data
US 2017/0089755 A1    Mar. 30, 2017

(51) Int. Cl.
| | |
|---|---|
| *G01G 21/22* | (2006.01) |
| *G01G 21/23* | (2006.01) |
| *B66F 7/02* | (2006.01) |
| *B66B 9/16* | (2006.01) |
| *F16M 11/20* | (2006.01) |
| *F16M 11/42* | (2006.01) |

(52) U.S. Cl.
CPC ............... *G01G 21/22* (2013.01); *B66B 9/16* (2013.01); *B66F 7/02* (2013.01); *F16M 11/20* (2013.01); *F16M 11/2014* (2013.01); *F16M 11/42* (2013.01); *G01G 21/23* (2013.01)

(58) Field of Classification Search
CPC .......... G01G 21/22; G01G 21/23; G01G 1/18; G01G 1/185; G01G 1/24; G01G 23/01; B66B 9/16; B66F 7/02; B66F 7/26; F16M 11/20; F16M 11/2007; F16M 11/2014; F16M 11/2021; F16M 11/42
See application file for complete search history.

(56) References Cited

U.S. PATENT DOCUMENTS

| | | | | |
|---|---|---|---|---|
| 3,000,114 | A * | 9/1961 | Orlov | G09B 19/02 434/194 |
| 3,711,877 | A * | 1/1973 | Averill | A61G 7/1015 5/87.1 |
| 3,850,307 | A * | 11/1974 | Motoda | B66C 23/005 212/237 |
| 3,938,820 | A * | 2/1976 | Nabinger | A61G 7/1019 108/147 |
| 4,131,181 | A * | 12/1978 | Vermette | B66B 9/16 187/232 |
| 4,468,366 | A * | 8/1984 | Socha, Jr. | B28B 3/269 264/177.12 |
| 4,715,477 | A * | 12/1987 | Suzuki | B66F 7/02 187/210 |

(Continued)

*Primary Examiner* — Randy Gibson
(74) *Attorney, Agent, or Firm* — Patterson + Sheridan, LLP

(57) ABSTRACT

Apparatus and method for simultaneously lifting and placing weights. The apparatus includes a support with a first arm and a second arm extending from the support. Weight supports are arranged at distal ends of the arms. The arms are movable to position weights supported by the weight supports. The apparatus also includes a lifting apparatus operable to selectively raise and lower the support. An operator can articulate the arms to storage locations of weights. The operator can then operate the lifting apparatus to raise the support and lift the weights. The operator can then articulate the arms to move the lifted weights to weight placement locations. The operator can then operate the lifting apparatus to lower the support and place the weights on the weight placement locations.

18 Claims, 4 Drawing Sheets

(56) References Cited

U.S. PATENT DOCUMENTS

| | | | | |
|---|---|---|---|---|
| 4,776,569 A * | 10/1988 | Nestel-Eichhausen | B66F 7/02 | 254/133 R |
| 4,825,977 A * | 5/1989 | Isogai | B66F 7/02 | 187/203 |
| 4,987,976 A * | 1/1991 | Daugherty | B66B 9/16 | 16/331 |
| 5,011,364 A * | 4/1991 | Anderson | B66C 23/48 | 188/171 |
| 5,501,296 A * | 3/1996 | Fletcher | B66B 9/025 | 187/210 |
| 5,584,363 A * | 12/1996 | Curtin | B66B 9/16 | 187/232 |
| 5,630,566 A * | 5/1997 | Case | A47B 23/046 | 248/122.1 |
| 5,697,110 A * | 12/1997 | Campbell | A61G 7/1019 | 177/144 |
| 5,708,993 A * | 1/1998 | Campbell | A61G 7/1019 | 177/144 |
| 5,740,886 A * | 4/1998 | Fletcher | B66B 9/04 | 187/205 |
| 5,927,989 A * | 7/1999 | Kung | G01G 1/22 | 177/190 |
| 6,129,319 A * | 10/2000 | Metelski | F16M 11/10 | 248/123.2 |
| 6,608,262 B1 * | 8/2003 | Eiswerth | B66F 3/36 | 177/146 |
| 6,864,437 B2 * | 3/2005 | Weber | G01G 21/26 | 177/145 |
| 8,975,541 B2 * | 3/2015 | Hornstein | B66F 7/28 | 177/146 |
| 9,371,217 B1 * | 6/2016 | DePumpo | B66F 9/20 | |
| 2001/0040233 A1 * | 11/2001 | Chamberlain | B25H 1/0014 | 254/4 R |
| 2002/0017595 A1 * | 2/2002 | Koyanagi | A47B 23/04 | 248/122.1 |
| 2002/0096371 A1 * | 7/2002 | Weber | G01G 21/22 | 177/50 |
| 2004/0031894 A1 * | 2/2004 | Smed | F16M 11/10 | 248/278.1 |
| 2006/0076543 A1 * | 4/2006 | Williamson | B66F 7/02 | 254/325 |
| 2007/0012853 A1 * | 1/2007 | Strauss | A61B 90/25 | 248/648 |
| 2008/0197257 A1 * | 8/2008 | Stoelinga | F16M 11/10 | 248/278.1 |
| 2010/0142039 A1 * | 6/2010 | Hammer | F16M 11/10 | 359/384 |
| 2010/0148021 A1 * | 6/2010 | Fadler | A61B 8/0825 | 248/124.1 |
| 2011/0168860 A1 * | 7/2011 | Newkirk | A61M 5/1415 | 248/274.1 |
| 2012/0032124 A1 * | 2/2012 | Drake | B66F 5/02 | 254/105 |
| 2013/0253261 A1 * | 9/2013 | Augarten | A61F 5/0059 | 600/37 |
| 2013/0313498 A1 * | 11/2013 | Polins | B66B 9/16 | 254/93 R |
| 2014/0291457 A1 * | 10/2014 | Rotheisler | F16M 11/2085 | 248/123.2 |
| 2016/0000995 A1 * | 1/2016 | Blankenship | A61M 5/1415 | 248/514 |
| 2016/0258573 A1 * | 9/2016 | Goldish | F16M 11/42 | |

* cited by examiner

WEIGHT LOADER FOR MOVING AT LEAST TWO LOADS

BACKGROUND

The present invention relates to a weight loading apparatus, and more specifically, to an apparatus for nearly-simultaneously placing two loads.

When loading weights on a pan scale, the weights are typically placed in pairs and in a symmetrical manner to prevent the scale from tipping. In some instances, the weights can be heavy, making manipulation of the weights difficult.

SUMMARY

According to one aspect, an apparatus for moving at least two loads includes a movable base and a shaft attached to and extending from the base. The apparatus also includes a support slidably disposed on the shaft, a first arm pivotally extending from the support, and a second arm pivotally extending from the support. The apparatus also includes a first weight support arranged at a distal end of the first arm. The first arm is articulatable in a plane to position the first weight support between a first weight stack and a first weight placement location. The apparatus also includes a second weight support arranged at a distal end of the second arm. The second arm is articulatable in the plane to position the second weight support between a second weight stack and a second weight placement location. The apparatus also includes a lifting apparatus operable to selectively raise and lower the support along the shaft.

According to one aspect, an apparatus for moving multiple loads includes a support. The apparatus also includes a first arm extending from the support and a second arm extending from the support. The first arm and the second arm include respective weight supports on distal ends thereof. The first arm and the second arm are articulatable to move respective weights in the respective weight supports in a predefined orientation with respect to one another. The apparatus also includes a lifting apparatus operable to selectively raise and lower the support.

According to one aspect, a method includes articulating a first arm to position a first weight support relative to a first weight in a first storage location. The method also includes articulating a second arm to position a second weight support relative to a second weight in a second storage location. The method also includes raising a support attached to the first arm and the second arm to lift the first arm and the second arm such that the first and second weight supports lift the respective first and second weights in a predefined orientation. The method also includes articulating the first and second arms to move the respective first and second weights to respective placement locations while maintaining the two weights in the predefined orientation. The method also includes lowering the support such that the first and second weight supports release the respective first and second weights on the respective placement locations while maintaining the predefined orientation.

DETAILED DESCRIPTION

In the following, reference is made to aspects presented in this disclosure. However, the scope of the present disclosure is not limited to specific described aspects. Instead, any combination of the following features and elements, whether related to different aspects or not, is contemplated to implement and practice contemplated aspects. Furthermore, although aspects disclosed herein may achieve advantages over other possible solutions or over the prior art, whether or not a particular advantage is achieved by a given aspect is not limiting of the scope of the present disclosure. Thus, the following aspects, features, and advantages are merely illustrative and are not considered elements or limitations of the appended claims except where explicitly recited in a claim(s). Likewise, reference to "the invention" or "the disclosure" shall not be construed as a generalization of any inventive subject matter disclosed herein and shall not be considered to be an element or limitation of the appended claims except where explicitly recited in a claim(s).

Figure 1A:
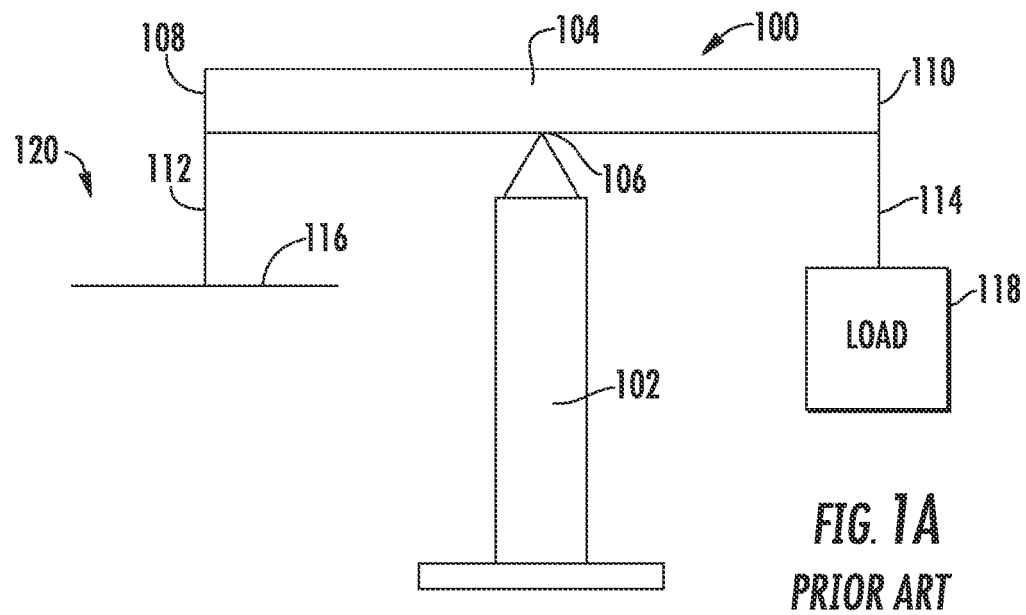
FIG. 1A is a side view of a pan scale.

In various instances, pan scales, such as the pan scale 100 shown in FIG. 1A, are used to measure the value (e.g., a weight) of a load 118. The load 118 (or a load cell) is arranged on one end 110 of a beam 104 of the pan scale 100. For example, the load 118 could be connected to the end 110 of the beam 104 via a cable 114, chain, or like device. As another example, the load 118 could be affixed to the end 110 of the beam 104. A weight pan 120 is connected to a second and 108 of the beam 104 via a cable 112, chain, or like device. The beam 104 is arranged on a pivot 106 on top of a base 102. The weight of the load 108 is determined by placing calibrated weights on the weight pan 120 until the beam 104 is balanced (e.g., is horizontal) on the pivot 106.

Figure 1B:
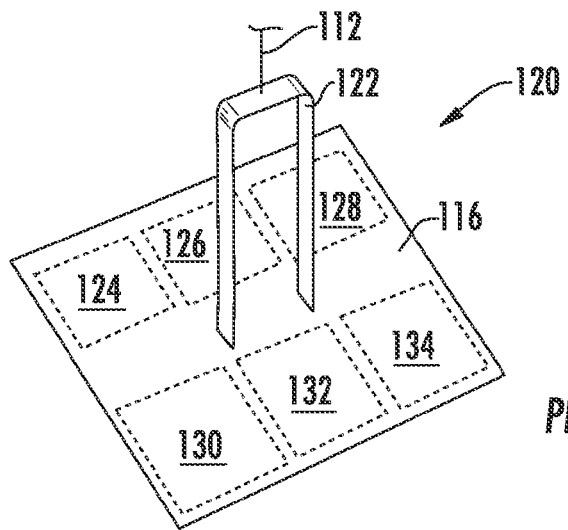
FIG. 1B is a perspective view of a pan for a pan scale, wherein broken lines indicate positions for calibrated weights.

FIG. 1B is a perspective view of the weight pan 120. The weight pan 120 includes a yoke 122 connected to the cable 112 at a top end and connected to a weight shelf 116 at a bottom end. FIG. 1B illustrates six broken line squares on the weight shelf 116, which depict weight placement locations on the weight shelf 116. For example, a first calibrated weight can be placed on a first weight placement location 124, a second calibrated weight can be placed on the second weight placement location 126, a third calibrated weight can be placed on a third weight placement location 128, a fourth calibrated weight can be placed on a fourth weight placement location 130, a fifth calibrated weight can be placed on a fifth weight placement location 132, and a sixth calibrated weight can be placed on a sixth weight placement location 134. Since the weight pan 120 is suspended from the cable 112, weights need to be placed in pairs in a symmetrical arrangement relative to the cable 112 to avoid causing the weight pan 120 to tip. For example, if a calibrated weight were placed in the first weight placement location 124 without placing a second calibrated weight in the sixth weight placement location 134, then the weight pan 120 would tilt such that the portion of the weight shelf 116 at the first weight placement location 124 would move downward. Such tilting could cause calibrated weights being placed on the weight shelf 116 or already in place on the weight shelf 116 to slide or topple. Thus, the calibrated weights are placed on the weight shelf 116 in pairs on opposite sides or opposite corners.

Figure 1C:
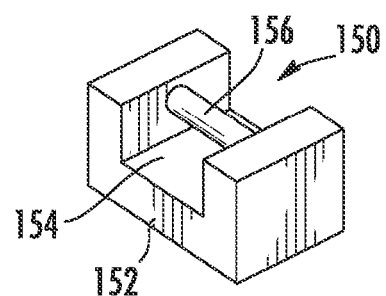
FIG. 1C is a perspective view of a calibrated weight for use with a pan scale.

FIG. 1C is a perspective view of an exemplary calibrated weight 150. The calibrated weight 150 has a cube-shaped body 152. The cube-shaped body 152 includes a recess 154 with a handle 156 integrated with the body 152 and arranged in the recess 154. In use, an operator of the pan scale 100 would pick up two of the calibrated weights 150, one calibrated weight 150 in each hand. The operator would position and place the two calibrated weights 150 on opposing weight placement locations on the weight pan 120 at substantially the same time to avoid toppling. In instances in which the load 118 to be measured is very heavy, the calibrated weights 150 could be heavy. For example, in some instances, the calibrated weights 150 could weigh 50 pounds each. Such heavy calibrated weights 150 can be difficult for an operator to pick up and maneuver for simultaneous placement on opposing weight placement locations.

In instances in which heavy calibrated weights 150 are used to measure the load 118, lifting and maneuvering the weights can be burdensome on an operator. FIGS. 2-5 illustrate a weight loader 200, according to one aspect, that can be operated to pick up calibrated weights 150, maneuver the calibrated weights 150 into position over opposing weight placement locations on the weight shelf 116, and simultaneously or nearly-simultaneously place the calibrated weights 150 on the weight shelf 116.

Figure 2:
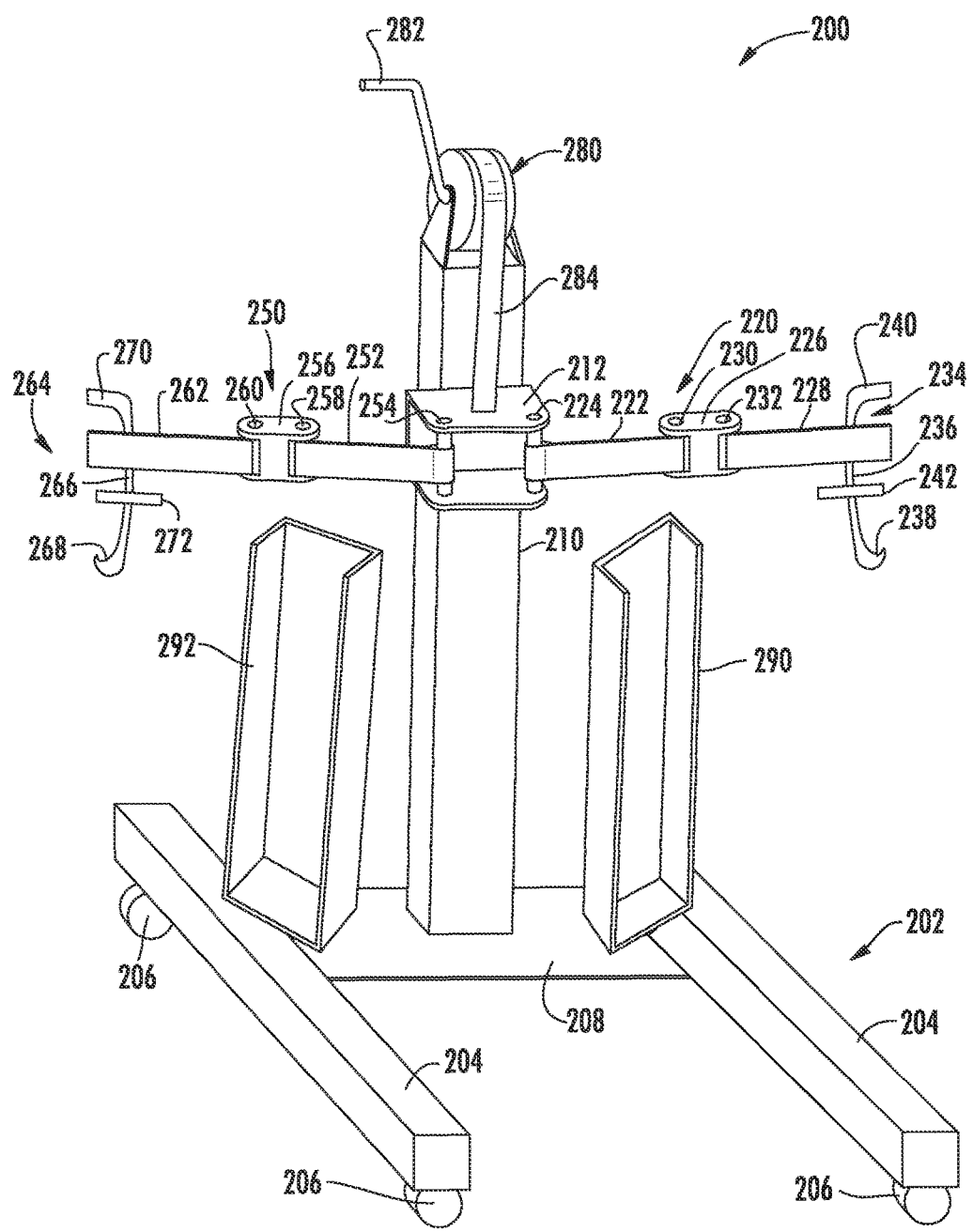
FIG. 2 is a perspective view of a weight loader according to one aspect for loading weights onto a pan scale.

FIG. 2 is a perspective view of the weight loader 200 that includes a movable platform 202. The movable platform 202 includes legs 204 with wheels 206 arranged underneath. The legs 204 are connected to each other via a platform 208. The wheels 206 could be caster wheels or other pivotable wheels that allow for the movable platform 202 to be moved and steered. A mast 210 extends vertically from the platform 208. A support 212 is slidably arranged at least partially around the mast 210. The support 212 is connected to a belt 284 (or strap, rope, chain, cable, or a like device) to a lifting apparatus 280 that can be operated to raise or lower the support 212 along the mast 210. The lifting apparatus 280 of the weight loader 200 is a hand operated winch. An operator can grasp the handle 282 to turn lifting apparatus 280 to reel in or reel out the belt 284 and thereby raise or lower, respectively, the support 212. In various aspects, the lifting apparatus 280 could be an electric winch or another driving apparatus, such as a hand-driven or motor-driven jackscrew.

The weight loader 200 includes a first arm 220 extending from the support 212 and a second arm 250 extending from the support 212. The first arm 220 includes a proximal sub-arm 222 and a distal sub-arm 228, wherein the terms proximal and distal are used with relation to the support 212. The proximal sub-arm 222 is pivotably attached to the support 212 via a pivot 224. The proximal sub-arm 222 can rotate about the pivot 224 relative to the support 212 in a substantially horizontal plane. A distal end of the proximal sub-arm 222 is connected to an elbow 226 (i.e., an elbow bracket) via a pivot 230. The elbow 226 can rotate about the pivot 230 relative to the proximal sub-arm 222 in the substantially horizontal plane. A proximal end of the distal sub-arm 228 is also connected to the elbow 226 via a pivot 232. The distal sub-arm 228 can rotate about the pivot 232 relative to the elbow 226 in the substantially horizontal plane. A weight support 234 is arranged at a distal end of the distal sub-arm 228. The weight support 234 includes a shaft 236 arranged through the distal sub-arm 228. A handle 240 is arranged at an upper end of the shaft 236 and a hook 238 is arranged at a lower end of the shaft 236. The handle 240 can be turned, which in turn rotates the shaft 236 and hook 238 to orient the hook 238 in a particular direction, discussed in more detail below.

Figure 5:
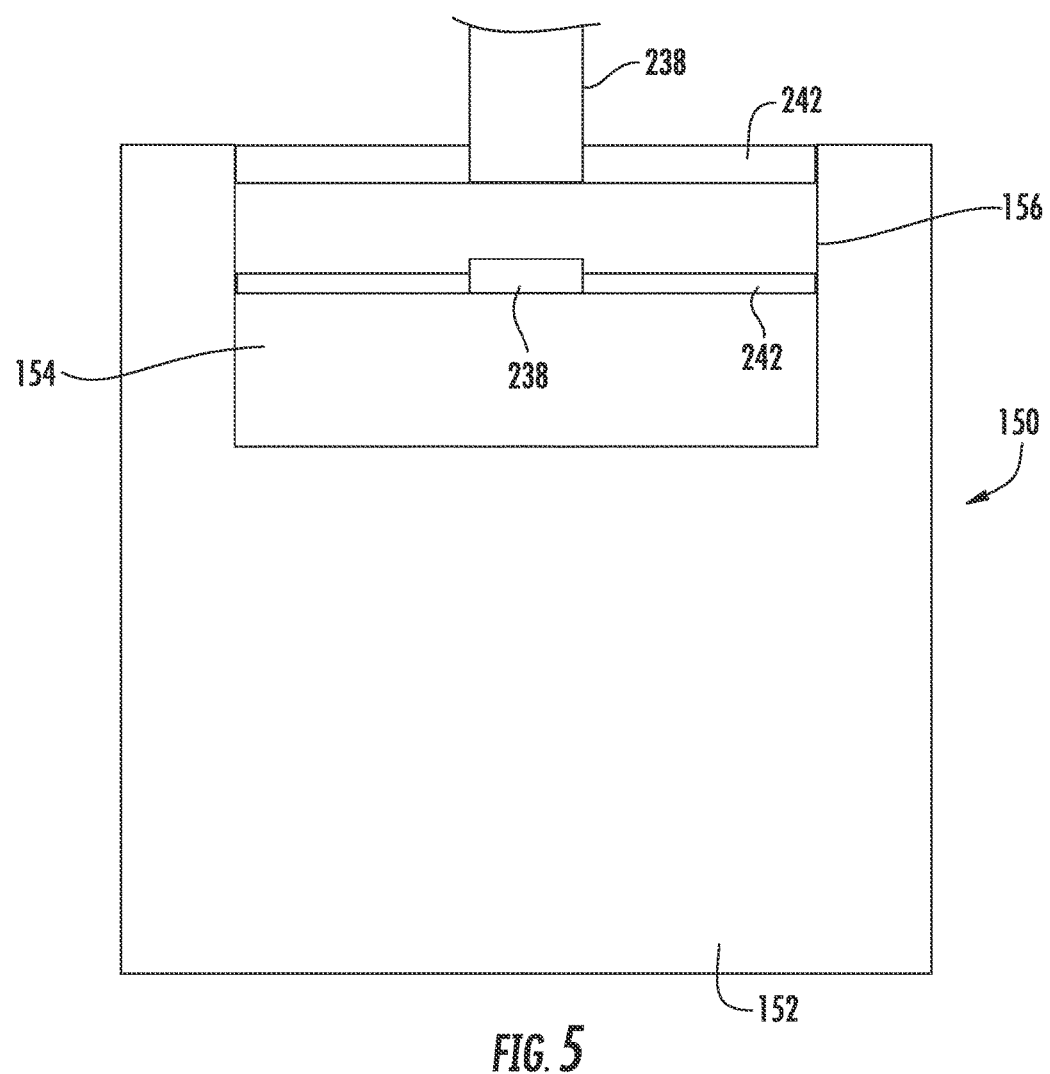
FIG. 5 is a front view of a calibrated weight supported by a weight support of the weight loader of FIG. 2.

The weight support 234 also includes a centering member 242 arranged on the shaft 236 and proximate to the hook 238. FIG. 5 illustrates the hook 238 engaged with a handle 156 of a calibrated weight 150. The centering member 242 extends across the recess 154 of the calibrated weight 150 to substantially center the hook 238 on the handle 156. Assuming that the calibrated weight 150 is substantially symmetric (e.g., in density and geometry), then substantially centering the hook 238 on the handle 156 results in the hook 238 lifting the calibrated weight 150 above a center of mass of the calibrated weight 150. As a result, the hook 238 would lift the calibrated weight 150 in a stable manner. The centering member 242 can also prevent the calibrated weight 150 from sliding through the hook 238 when the first arm 220 is articulated (i.e., when the proximal sub-arm 222, the elbow 226, and the distal sub-arm 228 are rotated about the respective pivots 224, 230, and 232). As shown in FIG. 5, the centering member 242 fits snugly within the recess 154 of the calibrated weight 150 such that sliding of the handle 156 through the hook 238 would be stopped or minimized by interference between the centering member 242 and sides of the recess 154.

The second arm 250 includes a proximal sub-arm 252 and a distal sub-arm 262. The proximal sub-arm 252 is pivotably attached to the support 212 via a pivot 254. The proximal sub-arm 252 can rotate about the pivot 254 relative to the support 212 in the substantially horizontal plane. A distal end of the proximal sub-arm 252 is connected to an elbow 256 (i.e., an elbow bracket) via a pivot 258. The elbow 256 can rotate about the pivot 258 relative to the proximal sub-arm 252 in the substantially horizontal plane. A proximal end of the distal sub-arm 262 is also connected to the elbow 256 via a pivot 260. The distal sub-arm 262 can rotate about the pivot 260 relative to the elbow 256 in the substantially horizontal plane. A weight support 264 is arranged at a distal end of the distal sub-arm 262. The weight support 264 includes a shaft 266 arranged through the distal sub-arm 262. A handle 270 is arranged at an upper end of the shaft 266 and a hook 268 is arranged at a lower end of the shaft 266. The handle 270 can be turned, which in turn rotates the shaft 266 and hook 268 to orient the hook 238 in a particular direction, discussed in more detail below. The weight support 264 includes a centering member 272 arranged on the shaft 266 and proximate to the hook 268

In various aspects, the pivots of the first arm 220 and the second arm 250 could include locking members that can be selectively engaged to lock the sub-arms and elbows into one or more relative positions. In various aspects, the pivots of the first arm 220 and the second arm 250 could include elastic members, such as springs, that bias the arms into a preferred position (e.g., a neutral position).

In various aspects, the arms 220 and 250 could include more or fewer sub-arms and more or fewer elbows. For example, in various aspects, the arms 220 and 250 could include a single sub-arm that is pivotably connected to the support 212 at a first end and connected to a weight support 234 or 264 at an opposite end. As another example, in various embodiments, the elbows could be omitted from between the sub-arms. For example, each proximal sub-arm and distal sub-arm could be mounted to a common pivot with the distal sub-arm arranged above or below the proximal sub-arm.

FIG. 2 also illustrates a first weight rack 290 and a second weight rack 292 that can store stacks of calibrated weights 150. As shown in FIG. 2, the first weight rack 290 and the second weight rack 292 are arranged on the movable platform 202. In such an arrangement, the stacks of calibrated weights 150 stored in the weight racks 290 and 292 can be moved with the remainder of the weight loader 200. In various aspects, the weight racks 290 and 292 could be stored at a stationary location (e.g., against a wall) and the weight loader could be moved to the weight racks 290 and 292 to retrieve and/or return calibrated weights 150.

Figure 3:
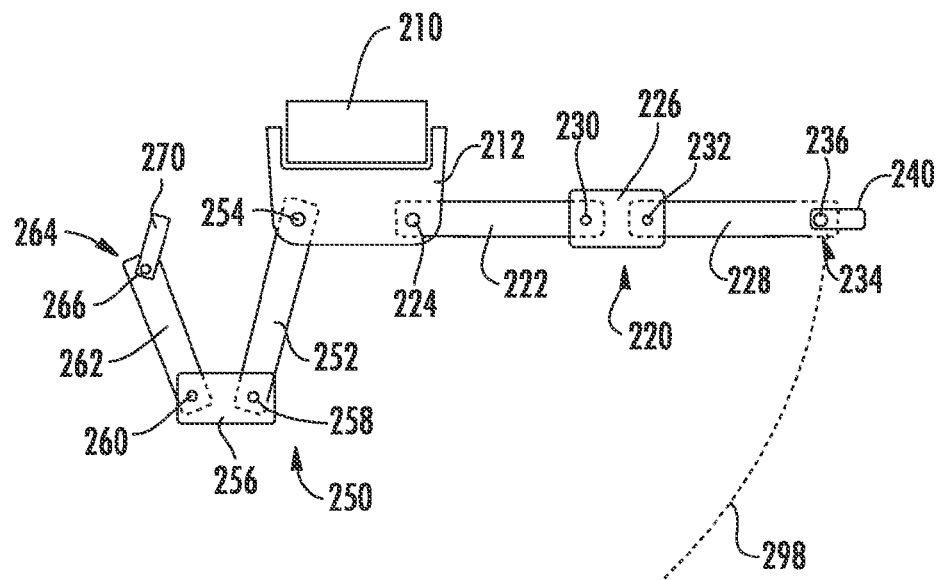
FIG. 3 is a top view of articulating arms of the weight loader of FIG. 2.

FIG. 3 is a top view of the mast 210, the support 212, the first arm 220, and the second arm 250. Other portions of the weight loader 200 have been omitted for clarity. FIG. 3 illustrates the first arm 220 articulated to a position in which the proximal sub-arm 222, the elbow 226, and the distal sub-arm 228 are arranged in a substantially straight line. Thus, the weight support 234 of the first arm 220 is as far away from the support 212 as possible. The first arm 220 could rotate about the pivot 224 at the support 212 to move the weight support 234 in a circular arc (depicted by broken-line arc 298) about the pivot 224 by rotating the proximal sub-arm 222 relative to the support 212, the elbow 226 relative to the proximal sub-arm 222, and the distal sub-arm 228 relative to the elbow 226, the weight support 234 can be positioned at many locations within the circular arc 298. For illustration purposes, the second arm 250 is illustrated in a position in which the elbow 256 is rotated to a near 90° angle relative to the proximal sub-arm 252 and the distal sub-arm 262 is arranged at a near 90° angle relative to the elbow 256. As a result, the weight support 264 of the second arm 250 is close to the pivot 254 connecting the proximal sub-arm 252 to the support 212. The first arm 220 and the second arm 250 can be independently articulated to move the respective weight supports 234 and 264 to lift or place calibrated weights 150 using the hooks 238 and 268, respectively.

Figure 4:
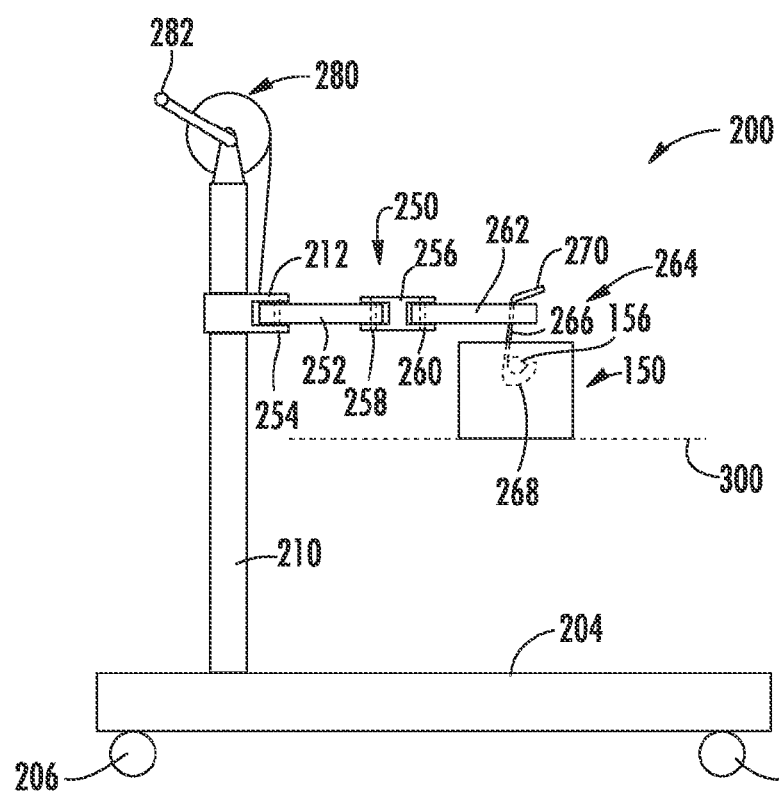
FIG. 4 is a side view of the weight loader of FIG. 2, wherein a calibrated weight is supported by the visible articulating arm.

FIG. 4 illustrates a side view of the weight loader 200. In the side view, only the second arm 250 is visible. FIG. 4 illustrates a calibrated weight 150 suspended from the hook 268 of the weight support 264 via the handle 156. The various pivots 254, 258, 260 are arranged in a substantially vertical orientation. As a result, as the second arm 250 articulates, the calibrated weight 150 remains in a substantially horizontal plane 300 (depicted as a broken line 300). A second calibrated weight may be suspended from the hook 238 of the weight support 234 of the first arm 220. The second calibrated weight 150 can also be arranged in the substantially horizontal plane 300. As shown in FIG. 4, the substantially horizontal plane 300 is illustrated as being aligned with the bottom of the calibrated weight 150. The substantially horizontal plane 300 could be aligned with other features of the calibrated weight 150 and/or the weight loader 200. For example, the substantially horizontal plane 300 could be aligned with a center of the handles 156 of the calibrated weights 150 or with a bottom of the hooks 238 and 268 of the weight supports 234 and 264, respectively. The substantially horizontal plane 300 is a predefined orientation for calibrated weights 150 supported by the weight supports 234 and 264. As discussed above, the calibrated weights 150 remain in the substantially horizontal plane 300 regardless of articulation of the first arm 220 and the second arm 250. Thus, the calibrated weights supported by the first arm 220 and the second arm 250 remain in the predefined orientation regardless of articulation of the first arm 220 and the second arm 250.

In various instances, material properties (e.g., material thickness and modulus of elasticity) will result in some deflection of the first arm 220 and the second arm 250 under load such that a calibrated weight 150 in one weight support (e.g., weight support 234) may be slightly higher or lower than a calibrated weight 150 in the other weight support (e.g., weight support 264). The calibrated weights 150 would be considered to be within the substantially horizontal plane 300 if the calibrated weights 150 are within a predefined tolerance distance from the substantially horizontal plane 300 and/or are within a functional limitation distance from the substantially horizontal plane 300. For example, a predefined tolerance distance could be 1 inch, such that the calibrated weights 150 would be considered in substantially the same horizontal plane 300 if they are vertically within 1 inch of each other. Other predefined tolerance distances could be 2 inches, 3 inches, etc. A functional limitation distance could be defined based on features of the weight shelf 116 depicted in FIG. 1B, for example. For example, the weight shelf 216 could include a lip around its perimeter that would prevent calibrated weights 150 from falling off of the weight shelf 116 in the event that the weight shelf 116 tilts. Such a lip may only prevent the calibrated weights 150 from sliding off of the weight shelf 116 for a certain amount of tilt. Thus, a functional limitation distance could be defined by the amount of tilt the weight shelf 116 can accommodate before such a lip would not prevent calibrated weights 150 from sliding off of the weight shelf 116. For example, in one application, a first calibrated weight 150 could be up to 2 inches lower than another calibrated weight 150 (such that the first calibrated weight 150 contacts the weight shelf 116 first, resulting in a tilt) before the weight shelf 116 would tilt to a degree that calibrated weights 150 would slide off. In another application, for example a first calibrated weight 150 could be up to 4 inches lower than another calibrated weight 150 for the weight shelf 116 would tilt to a degree that calibrated weights 150 would slide off.

Returning to FIG. 2, in use, an operator could maneuver the weight loader 200 toward a pan scale, such as the pan scale 100 shown in FIG. 1A. The operator could then articulate the first arm 220 and the second arm 250 to position the weight supports 234 and 264 relative to stacks of calibrated weights 150 in the weight racks 290 and 292. The operator may also use the handles 240 and 270 to rotate and orient the hooks 238 and 268, respectively, with the handles 156 of the calibrated weights 150. The operator can also operate the lifting apparatus 280 to raise or lower the support 212 to align the hooks 238 and 269 below the handles 156 of the calibrated weights 150. After the hooks 238 and 268 have been aligned with the handles 156 of the respective calibrated weights 150, the operator can operate the lifting apparatus 280 (e.g., turn the hand crank 282) to raise the support 212. Raising the support 212 engages the aligned hooks 238 and 269 with the handles 156 such that the calibrated weights 150 are lifted from the stacks of calibrated weights in the racks 290 and 292, respectively. After the calibrated weights 150 have been lifted from the racks 290 and 292, the operator can articulate the arms 220 and 250 to move the calibrated weights 150, suspended from the hooks 238 and 268, to weight placement locations of the weight shelf 116. Referring to FIG. 1B, the operator could articulate the first arm 220 to position the calibrated weight 150 carried by the hook 238 over the sixth weight placement location 134 and could articulate the second arm 250 to position the calibrated weight 150 carried by the hook 268 over the first weight placement location 124. As another example, the operator could articulate the first arm 220 to position the calibrated weight 150 carried by the hook 238 over the fifth weight placement location 132 and could articulate the second arm 250 to position the calibrated weight 150 carried by the hook 268 over the second weight placement location 126. As another example, the operator could articulate the first arm 220 to position the calibrated weight 150 carried by the hook 238 over the third weight placement location 128 and could articulate the second arm 250 to position the calibrated weight 150 carried by the hook 268 over the fourth weight placement location 130. After the first and second arms 220 and 250 have been articulated to move the respective calibrated weights 150 over opposing weight placement locations, the operator can operate the lifting apparatus 280 to lower the support 212 and thereby lower the calibrated weights 150 held by the hooks 238 and 268 toward the weight shelf 116. As the operator continues to operate the lifting apparatus 280 to lower the support 212, the calibrated weights 150 will contact the weight shelf 116 at the selected weight placement locations such that the weight shelf 116 will bear the weight of the calibrated weights 150. Further operation of the lifting apparatus 280 to lower the support 212 disengages the hooks 238 and 268 from the handles 156 of the calibrated weights. Thereafter, the operator can articulate the first and second arms 220 and 250 to move the weight supports 234 and 264, respectively, away from the just placed calibrated weights 150. The calibrated weights 150 are now supported by a weight shelf 116 for measurement of the load 118, shown in FIG. 1A. The above-described process can be repeated to place additional calibrated weights 150 on other weight placement locations of the weight shelf 116.

The operator can remove the calibrated weights from the weight shelf 116 in a similar manner. After the load 118 has been weighted using calibrated weights, the operator can move the movable platform 202 to position weight loader proximate to the weight shelf 116. The operator can then articulate the first arm 220 and the second arm 250 to position the weight supports 234 and 264, respectively, proximate to calibrated weights 150 on the weight shelf 116. For example, the first arm 220 could be articulated to position the weight support 234 proximate to a calibrated weight 150 arranged on the sixth weight placement location 134 and the second arm 250 could be articulated to position the weight support 264 proximate to a calibrated weight 150 arranged on the first weight placement location 124. The operator can also manipulate handles 240 and 270, respectively, of the weight supports 234 and 264 to orient the respective hooks 238 and 268 with the handles 156 of the calibrated weights 150. The operator can also operate the lifting apparatus 280 to raise or lower the support 212 as necessary to align the hooks 238 and 268 with the handles 156 of the calibrated weights 150. Once the hooks 238 and 268 are aligned and oriented with the handles 156 of the calibrated weights 150, the operator can operate the lifting apparatus 280 to raise the support 212 and thereby lift the calibrated weights 150 off of the weight shelf 116. The operator can then articulate the arms 220 and 250 to return the calibrated weights 150 to the weight racks 290 and 292. When the calibrated weights 150 are aligned with the weight racks 290 and 292 (and any calibrated weights 150 therein), the operator can operate the lifting apparatus 280 to lower the support to disengage the hooks 238 and 268 from the handles 156 the calibrated weights 150. The operator can repeat the above-described operation for other calibrated weights 150 on the weight shelf 116.

As described above with reference to FIGS. 2, 3, and 4, the first arm 220 and the second arm 250 maintain calibrated weights 150 in a horizontal predefined orientation. In other aspects, a weight loader could maintain calibrated weights (or other weights notes) and other predefined orientations. For example, in certain applications, one of the calibrated weights 150 could be placed on a surface that is higher than a surface for a second of the calibrated weights 150. In such an exemplary situation, the weight loader could include one arm arranged on the support at a higher distance than the second arm such that calibrated weights 150 supported by the arms are maintained a predefined relationship in which one of the calibrated weights 150 is higher than the second calibrated weight 150 by a certain amount. As another example, in other aspects, the calibrated weights 150 supported by the arms could be vertically oriented with respect to one another, and the calibrated weights 150 could be maintained in a vertical plane predefined orientation.

In various aspects, the weight supports could engage the calibrated weights using a device other than the hooks 238 and 268. For example, in certain aspects, the weight supports could include suction cups that are selectively in communication with a vacuum source to provide temporary attachment to a surface of a calibrated weight. The suction cups could temporarily attach to the calibrated weights for the purposes of moving the weights and placing them on the weight shelf 116. Once placed, the suction cups could be disconnected from the vacuum source to release the calibrated weights. As another example, in certain aspects, the weight supports could include mechanically, pneumatically, and/or hydraulically actuated grasping features, such as actuated clamps, that grasp the calibrated weights. In such aspects, actuation of the grasping features can be tied together or otherwise synchronized to ensure simultaneous grasping and releasing of the calibrated weights.

The descriptions of the various aspects have been presented for purposes of illustration, but are not intended to be exhaustive or limited to the aspects disclosed. Many modifications and variations will be apparent to those of ordinary skill in the art without departing from the scope and spirit of the described aspects. The terminology used herein was chosen to best explain the principles of the aspects, the practical application or technical improvement over technologies found in the marketplace, or to enable others of ordinary skill in the art to understand the embodiments disclosed herein.

While the foregoing is directed to aspects, other and further aspects may be devised without departing from the basic scope thereof, and the scope thereof is determined by the claims that follow.

What is claimed is:

1. An apparatus for moving at least two loads, comprising:
   a movable base;
   a shaft attached to and extending from the base;
   a support slidably disposed on the shaft;
   a first arm pivotally attached to the support, the first arm comprising a first proximal sub-arm and a first distal sub-arm, the first proximal sub-arm and the first distal sub-arm attached by a first elbow, wherein the first distal sub-arm is rotatable relative to the first proximal sub-arm about the first elbow;
   a second arm pivotally attached to the support, wherein the second arm comprises a second proximal sub-arm and a second distal sub-arm, wherein the second proximal sub-arm and the second distal sub-arm are attached by a second elbow, wherein the second distal sub-arm is rotatable relative to the second proximal sub-arm about the second elbow;
a first weight support arranged at a distal end of the first arm, wherein the first arm is articulatable in a plane to position the first weight support between a first weight stack and a first weight placement location;
a second weight support arranged at a distal end of the second arm, wherein the second arm is articulatable in the plane to position the second weight support between a second weight stack and a second weight placement location; and
a lifting apparatus operable to selectively raise and lower the support along the shaft.

2. The apparatus of claim 1, wherein the first arm is pivotably attached to the support by a first pivot such that the first arm is rotatable about the first pivot in the plane, wherein the second arm is pivotably attached to the support by a second pivot such that the second arm is rotatable about the second pivot in the plane.

3. The apparatus of claim 2, wherein the first distal sub-arm is rotatable in the plane relative to the first proximal sub-arm about the first elbow, wherein the first pivot is arranged at a proximal end of the first proximal sub-arm, and wherein the first weight support is arranged at a distal end of the first distal sub-arm; and
wherein the second distal sub-arm is rotatable in the plane relative to the second proximal sub-arm about the second elbow, wherein the second pivot is arranged at a proximal end of the second proximal sub-arm, and wherein the second weight support is arranged at a distal end of the second distal sub-arm.

4. The apparatus of claim 3, wherein the first elbow comprises a first elbow bracket that includes a first elbow pivot arranged toward a first end and a second elbow pivot arranged toward a second end, wherein the first end of the first elbow bracket is rotatable in the plane relative to a distal end of the first proximal sub-arm about the first elbow pivot, wherein a proximal end of the first distal sub-arm is rotatable in the plane relative to the second end of the first elbow bracket about the second elbow pivot, wherein the second elbow comprises a second elbow bracket that includes a third elbow pivot arranged toward a third end and a fourth elbow pivot arranged toward a fourth end, wherein the third end of the second elbow bracket is rotatable in the plane relative to a distal end of the second proximal sub-arm about the third elbow pivot, wherein a proximal end of the second distal sub-arm is rotatable in the plane relative to the fourth end of the first elbow bracket about the fourth elbow pivot.

5. The apparatus of claim 4, wherein first weight support is connected to the distal end of the first distal sub-arm via a third pivot and can selectively rotate about the third pivot; and wherein the second weight support is connected to the distal end of the second distal sub-arm via a fourth pivot and can selectively rotate about the fourth pivot.

6. The apparatus of claim 1, wherein the first weight support comprises a first hook adapted to engage a first weight, and wherein the second weight support comprises a second hook adapted to engage a second weight.

7. The apparatus of claim 6, wherein the first weight support further comprises a first centering member adapted to engage at least one surface of the first weight such that the first hook engages a center of mass of the first weight, and wherein the second weight support further comprises a second centering member adapted to engage at least one surface of the second weight such that the second hook engages a center of mass of the second weight.

8. The apparatus of claim 1, wherein the lifting apparatus comprises a hand-operated winch.

9. The apparatus of claim 1, further comprising a movable platform, wherein the support, the first arm, the second arm, the first weight support, the second weight support, and the lifting apparatus are arranged on the movable platform.

10. The apparatus of claim 9, wherein the first weight stack and the second weight stack are arranged on the movable platform.

11. An apparatus for moving multiple loads, comprising:
a movable platform;
a support disposed on the movable platform;
a first arm extending from the support and a second arm extending from the support, wherein the first arm and the second arm include respective weight supports on distal ends thereof, and wherein the first arm and the second arm are articulatable to move respective weights in the respective weight supports in a predefined orientation with respect to one another;
a lifting apparatus operable to selectively raise and lower the support; and
a first weight stack and a second weight stack arranged on the movable platform, wherein the first weight stack and the second weight stack support weights in the predefined orientation relative one another.

12. The apparatus of claim 11, wherein the predefined orientation comprises a substantially horizontal plane in which a weight in a weight support of the first arm and a weight in a weight support of the second arm are positioned.

13. The apparatus of claim 11, wherein the weight supports comprise hooks adapted to engage the respective weights.

14. The apparatus of claim 13, wherein the weight supports further comprise respective centering members adapted to engage surfaces of the weights such that the respective hooks engage centers of mass of the weights.

15. A method, comprising:
articulating a first arm to position a first weight support relative to a first weight in a first storage location, the articulating the first arm including moving a first proximal sub-arm relative to a first distal sub-arm about a first elbow that couples the first proximal sub-arm to the first distal sub-arm;
articulating a second arm to position a second weight support relative to a second weight in a second storage location, the articulating the second arm including moving a second proximal sub-arm relative to a second distal sub-arm about a second elbow that couples the second proximal sub-arm to the second distal sub-arm;
raising a support attached to the first arm and the second arm to lift the first arm and the second arm such that the first and second weight supports lift the respective first and second weights in a predefined orientation,
articulating the first and second arms to move the respective first and second weights to respective placement locations while maintaining the respective first and second weights in the predefined orientation; and
lowering the support such that the first and second weight supports release the respective first and second weights on the respective placement locations while maintaining the first and second weights in the predefined orientation.

16. The method of claim 15, further comprising:
articulating the first arm to position the first weight support relative to the first weight in the respective placement location;

articulating the second arm to position the second weight support relative to the second weight in the respective placement location;

raising the support such that the first and second weight supports lift the respective first and second weights from the respective placement locations while maintaining the two weights in the predefined orientation;

articulating the first arm to move the first weight to the first storage location and articulating the second arm to move the second weight to the second storage location while maintaining the respective first and second weights in the predefined orientation;

lowering the support such that the first and second weight supports release the respective first and second weights on the respective storage locations.

17. The method of claim 15, wherein articulating the first arm to position the first weight support relative to the first weight in the first storage location comprises aligning the first weight support with a center of mass of the first weight, and wherein articulating the second arm to position the second weight support relative to the second weight in the second storage location comprises aligning the second weight support with a center of mass of the second weight.

18. The method of claim 15, wherein the predefined orientation comprises a substantially horizontal plane in which the first weight and the second weight are positioned.

* * * * *